United States Patent [19]

Dahlberg

[11] 4,344,832

[45] Aug. 17, 1982

[54] ELECTRODE SYSTEM FOR A FUEL OR ELECTROLYSIS CELL ARRANGEMENT

[75] Inventor: Reinhard Dahlberg, Flein, Fed. Rep. of Germany

[73] Assignee: Licentia Patent-Verwaltungs-G.m.b.H., Frankfurt am Main, Fed. Rep. of Germany

[21] Appl. No.: 165,110

[22] Filed: Jul. 1, 1980

[30] Foreign Application Priority Data

Jul. 3, 1979 [DE] Fed. Rep. of Germany ....... 2926776

[51] Int. Cl.$^3$ .................. C25B 9/00; C25B 11/02; C25B 11/04; H01M 2/00
[52] U.S. Cl. .................. 204/258; 204/266; 204/282; 204/290 R; 204/290 F; 204/292; 204/294; 204/295; 204/296; 429/34
[58] Field of Search .................. 204/252–258, 204/263–266, 295–296, 294, 290 R, 292, 291, 129, 279, 282; 429/34–39

[56] References Cited

U.S. PATENT DOCUMENTS

| | | |
|---|---|---|
| 2,175,523 | 10/1939 | Greger . |
| 3,394,032 | 7/1968 | Danner .................. 429/39 X |
| 4,013,535 | 3/1977 | White .................. 204/258 X |
| 4,175,165 | 11/1979 | Adlhart .................. 429/39 X |
| 4,247,376 | 1/1981 | Dempsey et al. .................. 204/266 X |

FOREIGN PATENT DOCUMENTS

| | | |
|---|---|---|
| 410865 | 3/1925 | Fed. Rep. of Germany . |
| 416541 | 1/1926 | Fed. Rep. of Germany . |
| 1039042 | 3/1959 | Fed. Rep. of Germany . |
| 2059868 | 6/1971 | Fed. Rep. of Germany . |
| 2100214 | 7/1971 | Fed. Rep. of Germany . |
| 2213603 | 10/1973 | Fed. Rep. of Germany . |
| 2420011 | 11/1975 | Fed. Rep. of Germany . |
| 2529470 | 1/1976 | Fed. Rep. of Germany . |
| 2538000 | 4/1976 | Fed. Rep. of Germany . |
| 2735239 | 2/1978 | Fed. Rep. of Germany . |
| 2735058 | 3/1978 | Fed. Rep. of Germany . |
| 1574016 | 7/1969 | France . |
| 1584577 | 12/1969 | France . |
| 2100878 | 3/1972 | France . |
| 2221822 | 10/1974 | France . |

*Primary Examiner*—Delbert E. Gantz
*Assistant Examiner*—Donald R. Valentine
*Attorney, Agent, or Firm*—Spencer & Kaye

[57] ABSTRACT

An electrode system comprises two discs or plates forming an anode and a cathode, each of the discs or plates having a structure of parallel ridges and grooves on at least one of the main surfaces, the discs or plates being assembled together with their structures facing and orientated so that the ridges on one disc or plate cross the ridges on the other disc or plate and a membrane is located between the structured surfaces of the discs or plates so as to be abutted on both sides by the ridges thereof and form the grooves between the ridges into chambers on each side of the membrane.

10 Claims, 6 Drawing Figures

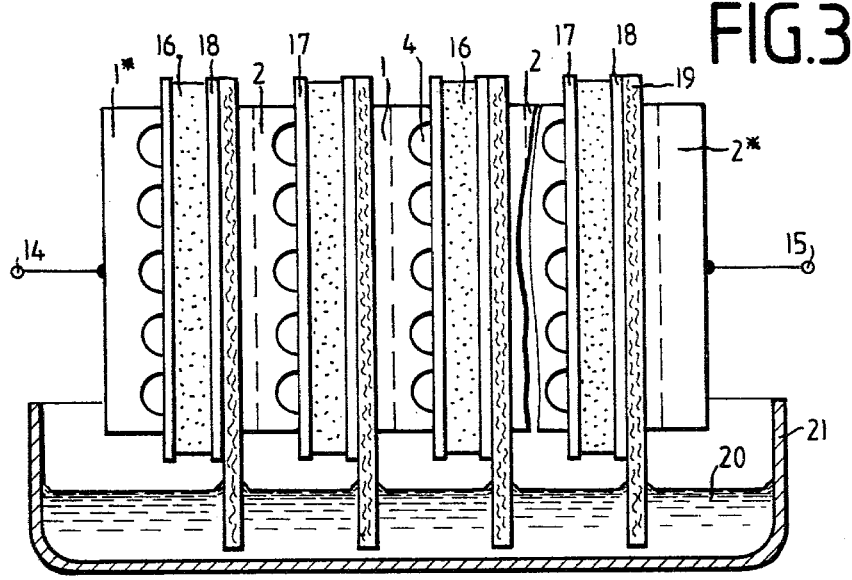
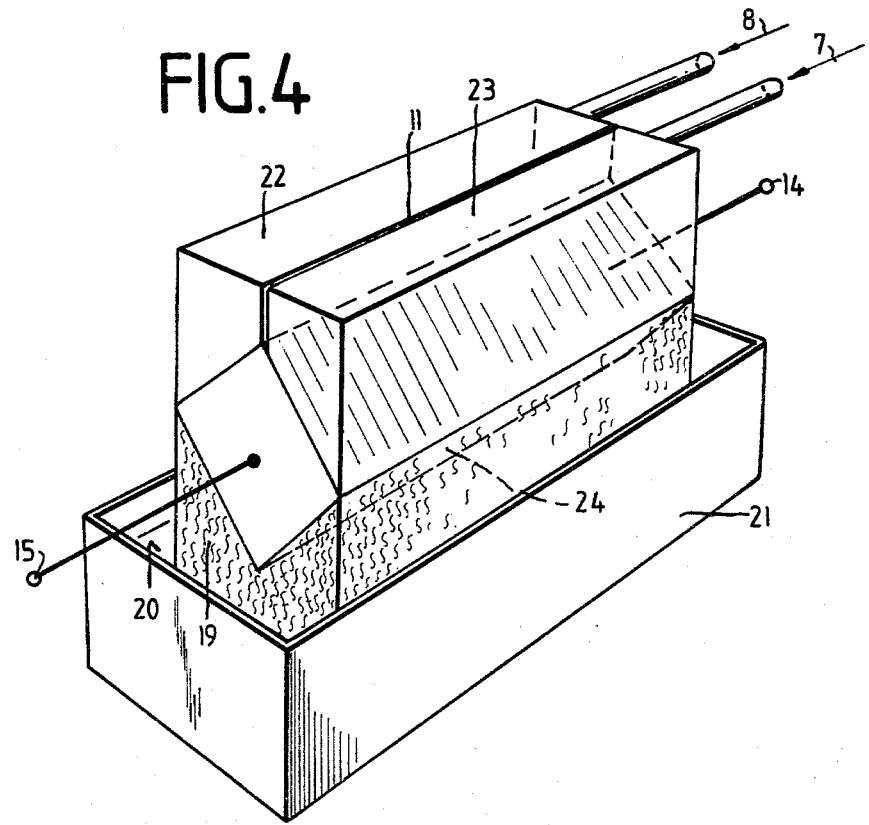

ELECTRODE SYSTEM FOR A FUEL OR ELECTROLYSIS CELL ARRANGEMENT

BACKGROUND OF THE INVENTION

The present invention relates to an electrode system for fuel and/or electrolysis cells.

Electrodes for electrolysis, e.g., of water or for catalytic cold combustion of hydrogen and oxygen consist of a carefully coordinated selection of materials because of the mechanical, electrical, thermal and chemical arrangement thereof.

While in the past the construction selected both for electrolysis cells and for fuel cell batteries was the so-called mould shape (similar to accumulators, for example), so-called filter press construction is being preferred increasingly today.

With the filter press type construction, the individual electrodes are fitted into a support for supply and removal of reaction gases and of the electrolytes. The electrodes are placed in a support in the form of a filter press with intermediate seals. The chambers for reaction gas and electrolyte between the electrodes, formed by the seals and the electrode supports, are connected by means of small channels having recesses, through which the material for the electrochemical reaction is transported. In the case of bipolar construction, another electrical connection from the anode to the cathode of two adjacent fuel cells is present so that, in the case of layering like a filter press, the fuel cells are automatically connected electrically in series. Since with this construction both the hydrogen chamber and the oxygen chamber border each other, both gas chambers have to be separated by a corrosion-resistant, electrically conductive and gas-tight film. This film is in electrically conductive connection with respect to the anode and the cathode. A relatively compact and operationally reliable construction is achieved with this type of construction.

SUMMARY OF THE INVENTION

It is an object of the invention to further increase the compactness of the construction of fuel cells and electrolysis cells.

According to a first aspect of the invention, there is provided an electrode system comprising two places or discs to form an anode and cathode, a structure of parallel ridges and grooves on at least one main surface of each of the plates or discs and orientated to cross the ridges and grooves on the other plate or disc when the plates or discs are assembled together with their structured surfaces facing and a membrane located between the structured surfaces of the plates or discs and abutted on each side by the ridges to turn the grooves into chambers on each side of the membrane.

According to a second aspect of the invention, there is provided an electrode system for a fuel and/or electrolysis cell, in which two plates or discs made from suitable material are provided as the anode and cathode; each plate or disc has a structure of alternating and parallel ridges and grooves at least on one of its two surfaces; and that the two places or discs with at least one membrane as an intermediate layer are so assembled with their structured surfaces that all of the ridges in the structure of both plates cross and at the crossing points abut against both sides of the membrane so that the grooves form two crossing systems of semicylinders running in parallel with each other and separated by the membrane.

BRIEF DESCRIPTION OF THE DRAWINGS

The invention will now be described in greater detail, by way of example, with reference to the drawings, in which:

FIG. 3a is a view similar to FIG. 2 but showing a third embodiment of the invention, and FIG. 3b is a perspective view of the embodiment shown in FIG. 3a.

DESCRIPTION OF THE PREFERRED EMBODIMENTS

Figure 1A:
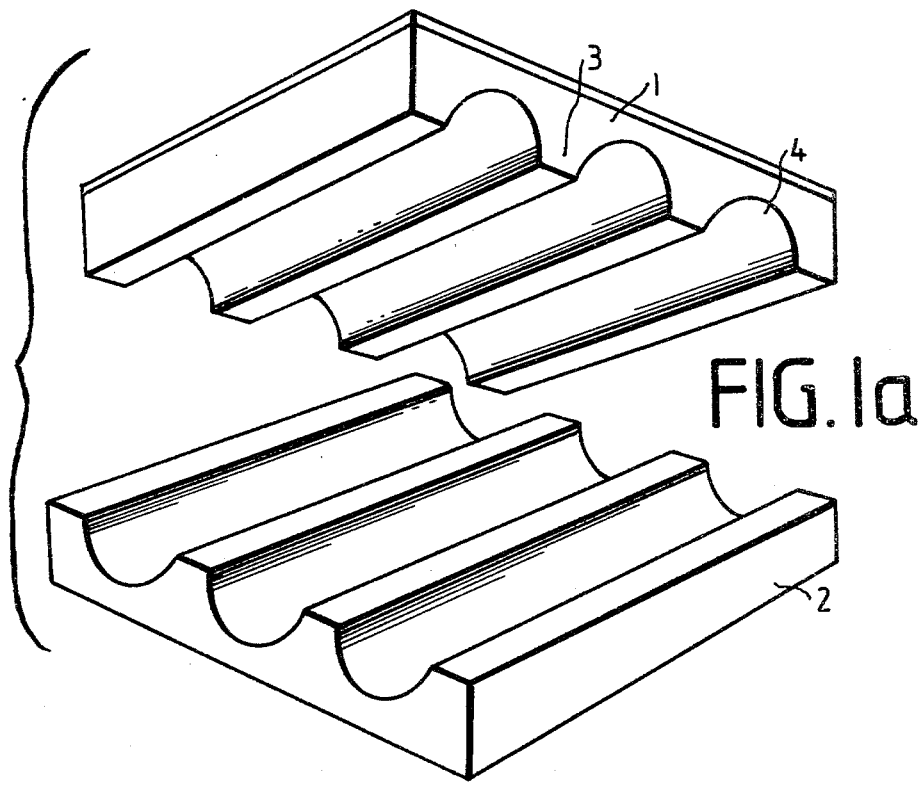
FIG. 1a is a perspective view of two structured plates for forming an electrode system in accordance with the invention.

Basically the invention provides two plates or discs made from suitable material as the anode and cathode with, each plate or disc having a structure of alternate and parallel ridges and grooves on at least one of its two surfaces and with the two plates or discs having at least one membrane as an intermediate layer. The two plates or discs are assembled with their structured surfaces facing such that the ridges in the structure of both plates or discs intersect or cross and, at the crossing points, abut both sides of the membrane so that the ridges in both plates or discs form two crossing systems of semicylinders running parallel to each other, and separated by the membrane.

The principle of crossing parallel ridges has already been described in German Offenlegungsschrift No. P 25 47 262, laid open on Apr. 28th, 1977. The refinement of this principle as electrodes for electrolysis and fuel cells is not mentioned there however.

In a preferred embodiment, the two systems of semicylinders are rotated with respect to their structures preferably by 90° in the plane of the plates or discs. These two separate systems of parallel semicylinders may be used to supply or remove reaction partners and reaction products.

The plates or discs may comprise graphite, metal coated with graphite, metal, a metallically conductive compound or highly doped semiconductor material such as strontium titanate, for example, or silicon.

The membrane may comprise inorganic felt, glass paper, asbestos paper or organic material such as PVC, polyethylene or polysulphonate, for example.

The membrane may be an ion-exchange membrane or a matrix having a fixed electrolyte (e.g. a glass fleece impregnated with acid.

The anode side and cathode side of the membrane may be coated with a layer of catalyst in each case. For example, tungsten carbide powder is suitable for the cathode and carbon powder for the anode.

A water-repellent foil or film ("wick film") may be arranged between the membrane and the cathode or between the membrane and the anode. The electrodes in accordance with the invention may be used for example with a glass paper membrane in an electrolysis arrangement for manufacturing hydrogen and oxygen. Furthermore, they may be used with an ion-exchange membrane, for example, having catalyst layers and a wick membrane on the cathode side in a fuel cell arrangement for hydrogen and oxygen.

The thickness of the plates or discs is preferably less than $5 \cdot 10^{-2}$ cm. With a groove depth of $5 \cdot 10^{-3}$ cm, electrodes may be manufactured, for example, which have a system of parallel grooves on both sides while the groove systems of both discs are rotated preferably by 90° with respect to each other. The grooves have a maximum width of approximately $2 \cdot 10^{-2}$ cm. Assembled with a membrane which is approximately $5 \cdot 10^{-3}$ cm thick, 400 electrolysis cells, for example, may be produced with a length of 10 centimeters by laying the electrodes connected electrically in series. It is possible with these electrolysis batteries, with the same electrolysis power per weight or volume (as in conventional electrolysis batteries) to operate at substantially smaller current densities. The current densities are preferably less than 20 mA/cm², and in one embodiment amount to say 1 mA/cm².

Since the degree of efficiency with small current densities is, as is well known, greater than with fairly large current densities, the electrodes in accordance with the invention make higher degrees of efficiency of energy conversion possible in electrolysis cells and in fuel cells with the same specific weight.

Referring now to the drawings, three embodiments of the invention will now be described, Embodiment 1 is an electrolysis cell for producing hydrogen and oxygen from water.

Embodiment 2 is an electrolysis battery for producing hydrogen and oxygen from water.

Embodiment 3 is a fuel cell battery for cold combustion of hydrogen and oxygen.

EMBODIMENT 1

Figure 1B:
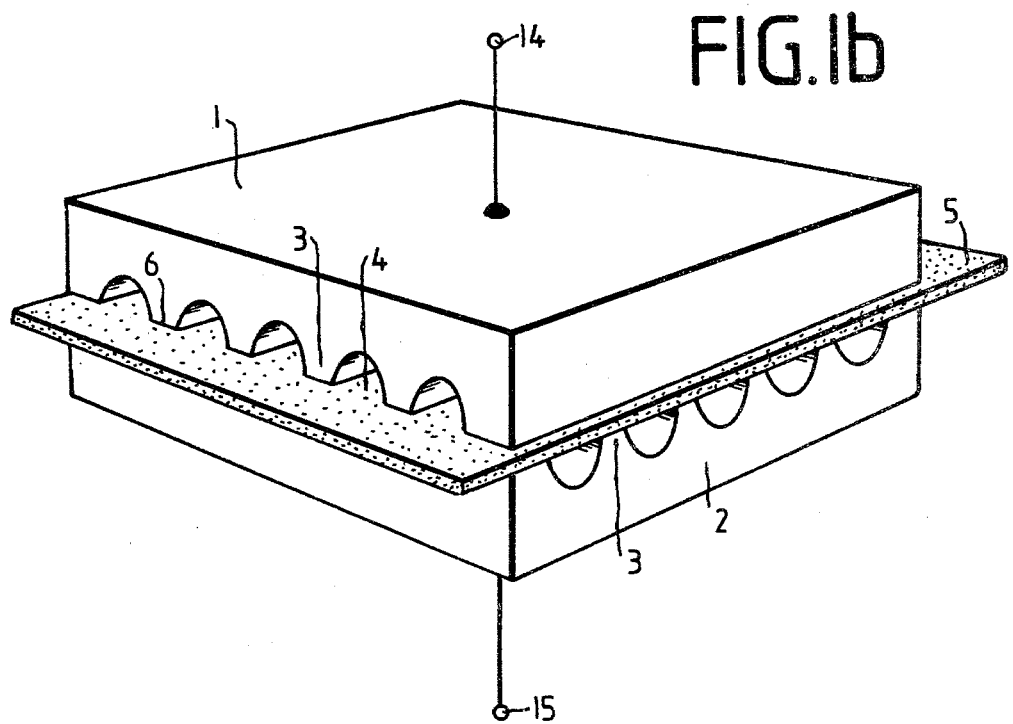
FIG. 1b is a perspective view of a complete electrode system.
Figure 1C:
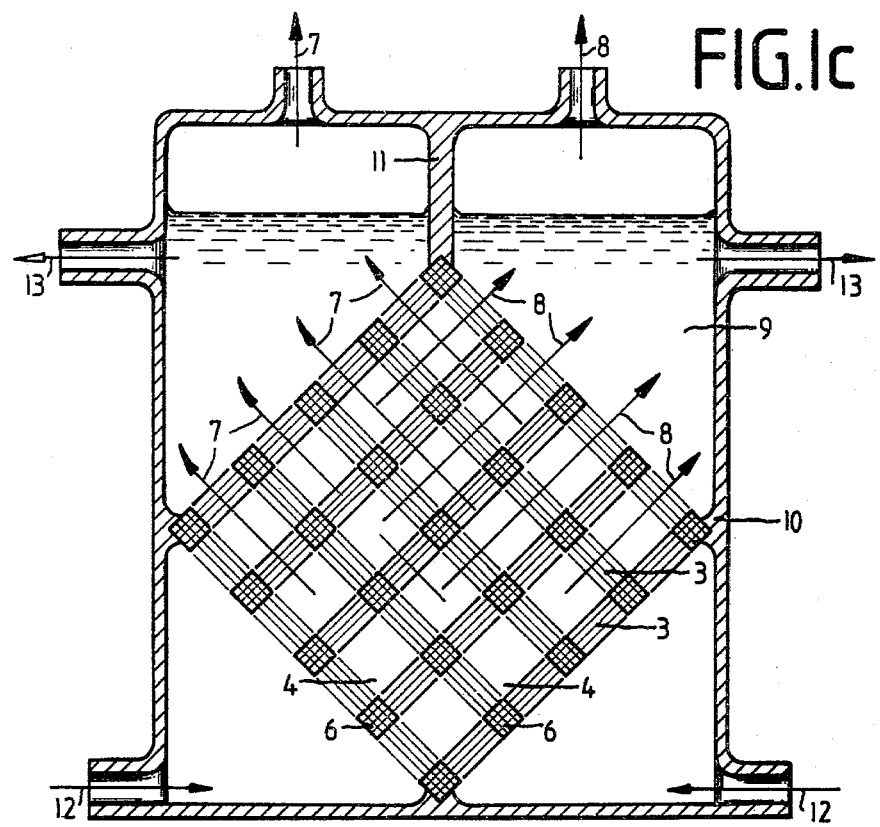
FIG. 1c is a diagrammatic view of the system of FIG. 1b in operation.
Figure 2:
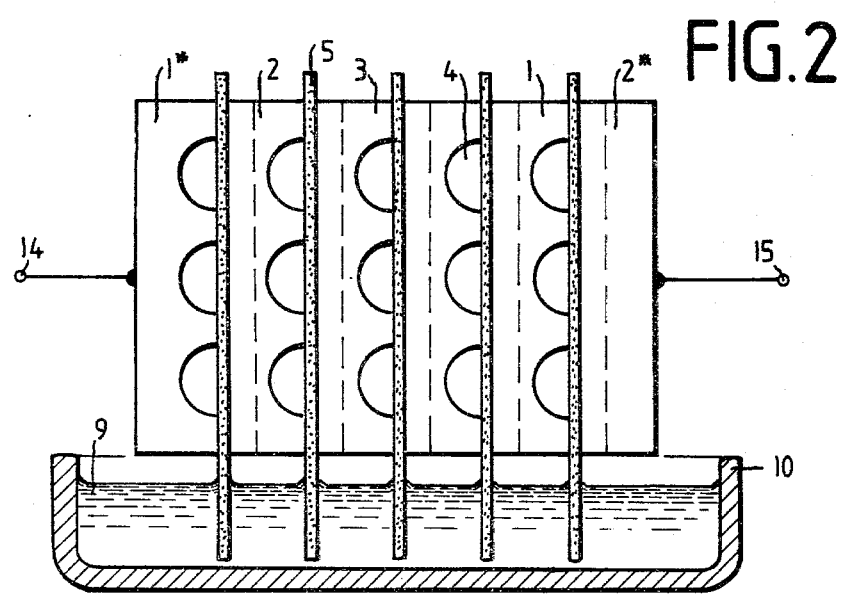
FIG. 2 is a diagrammatic view of a second embodiment of an electrode system of the invention.

In FIG. 1a, 1 and 2 are plates made from pyrolytic graphite which has a structure of alternate and parallel ridges 3 and grooves 4 on one side. The ridges taper towards a flat end face. Both plates 1 and 2 are placed on to each other in the plane of the plates, but rotated with respect to each other by 90° in relation to the structures and with a membrane 5 as an intermediate layer, as shown in FIG. 1b. Pressure contacts 6 are formed in the regions of the ridge crossings 3. Reference numeral 14 is the cathode connection on the plate 1 and numeral 15 the anode connection on the plate 2. In FIG. 1c, the arrangement according to FIG. 1b is shown in a vessel 10 with an acidic electrolyte 9. The arrangement of the electrodes is therefore in the picture plane so that with a representation drawn as if it were transparent, the systems of channels or semicylinder become visible. The electrolyte 9 flows through the inlets 12 into the vessel 10 and is forced because of the construction of the vessel and the arrangement of the electrodes in the vessel to flow through the two parallel systems of semicylinders which are rotated by 90°. The oxygen 7 flows with the electrolyte 9 through the system of semicylinders from bottom right to top left and the hydrogen 8 flows with the electrolyte 9 from bottom left to top right. Reference numeral 11 indicates a separating wall which separates the collecting chamber for oxygen 7 from the collecting chamber for hydrogen 8. The electrolyte 9 is passed back through the outlets 13 to the inlets 12.

EMBODIMENT 2

In FIG. 2, 1 and 2 are graphite plates which have on both sides a structure having parallel ridges 3 and grooves 4 up to the closure plates 1* and 2* which are provided with structures on one side. The parallel ridge/groove structures on the front and back of the plates are rotated with respect to each other by 90°. The membranes 5 between the plates 1 and 2 project downwardly into a vessel 10 which contains acidified water 9. The membranes 5 are saturated in acid and suck the water 9 out of the vessel 10, due to their wick action, between the electrodes 1 and 2. Reference numeral 14 is the cathode connection at the plate 1* and numeral 15 is the anode connection of the electrolysis battery at the plate 2*. The oxygen and hydrogen produced is removed separately in a similar manner to the arrangement illustrated in FIG. 1c.

EMBODIMENT 3

In FIG. 3a, 1 and 2 are nickel plates which have a structure with parallel grooves 4 and ridges 3 on both sides with the exception of the closure plates 1* and 2* which are provided with structures on one side. The direction of the parallel ridges 3 and grooves 4 from the front to the rear of the plates 1 or 2 is offset by 90°. The plates are assembled moreover so that the ridge structures at the surfaces of two adjacent plates cross. An ion-exchanger membrane 16 which has a Pt-catalyst layer 17 on the cathode side and a (Pt+Pd)-catalyst layer 18 on the anode side lies between the plates 1 and 2 in each case. Moreover a water-repellent film 19 which is sufficiently electrically conductive is located between this membrane and the cathode in each case. The water-repellent film extends into the collecting vessel 21 for the reaction water 20. Reference numeral 14 is the cathode connection at the closure plate 1* and numeral 15 is the anode connection at the other connection closure plate 2*.

This fuel cell battery is shown perspectively once again in FIG. 3b. The hydrogen or oxygen flows which are passed into the fuel cell battery 24 (as shown in FIG. 3a in cross-section) are numbered 7 and 8, respectively. Numeral 11 is the separating wall between the hydrogen chamber 23 and the oxygen chamber 22, while numerals 14 and 15 are the cathode and anode connections. The water-repellent films 19 hang into the vessel 21 in which the reaction water 20 is collected.

It will be understood that the above description of the present invention is susceptible to various modifications and adaptations.

What is claimed is:

1. An electrode system for a fuel and/or electrolysis cell, in which: two plates or discs made from suitable material are provided as the anode and cathode electrodes; each plate or disc has a thickness of less than $5 \times 10^{-2}$ cm and a structure of alternating and parallel ridges and grooves at least on one of its two surfaces; the two plates or discs with at least one membrane as an intermediate layer are assembled with their structured surfaces such that all of the ridges in the structure of both plates cross and at the crossing points abut against both sides of the membrane so that the grooves form two crossing systems of semicylinders running in parallel with each other, and separated by the membrane; and the current density through the electrodes is less than $2 \times 10^{-2}$ amperes/cm².

2. An electrode system as defined in claim 1, wherein the axis of the cylinders of the two semicylinder systems are rotated in the plane of the plates by an angle of 90° with respect to each other.

3. An electrode system as defined in claim 1, wherein the two separate systems of parallel semicylinders are provided for the supply and removal of reactants and reaction products.

4. An electrode system as defined in claim 1, wherein said plates or discs comprise a material selected from the group consisting of graphite, metal coated with graphite, metal, a metallically conductive compound and highly doped semiconductor material.

5. An electrode system as defined in claim 1, wherein said membrane comprises a material selected from the group consisting of inorganic felt, glass paper, asbestos paper and an organic material.

6. An electrode system as defined in claim 1, wherein the membrane is an ion exchanger membrane or a matrix having a fixed electrolyte and its anode side and its cathode side are coated with a layer of catalyst.

7. An electrode system as defined in claim 1, and comprising a water-repellent film placed between the membrane and the cathode.

8. An electrode system as defined in claim 1, and comprising a water repellent film placed between the membrane and the anode.

9. An electrode system as defined in claim 1, wherein several said plates or discs are assembled to form a cascade with one side of a said plate or disc being an anode and the other side of said plate or disc being a cathode.

10. An electrode system as defined in claim 1 or 9 wherein said grooves have a depth of approximately $5 \times 10^{-3}$ cm and a maximum width of approximately $2 \times 10^{-2}$ cm.

* * * * *